US007889724B2

(12) United States Patent
Irvin

(10) Patent No.: US 7,889,724 B2
(45) Date of Patent: Feb. 15, 2011

(54) MULTI-STATION MEDIA CONTROLLER

(75) Inventor: William Irvin, Laguna Beach, CA (US)

(73) Assignee: WideOrbit, Inc., San Francisco, CA (US)

( * ) Notice: Subject to any disclaimer, the term of this patent is extended or adjusted under 35 U.S.C. 154(b) by 506 days.

(21) Appl. No.: 11/735,404

(22) Filed: Apr. 13, 2007

(65) Prior Publication Data

US 2008/0253307 A1 Oct. 16, 2008

(51) Int. Cl.
*H04L 12/50* (2006.01)

(52) U.S. Cl. ...................................................... 370/360

(58) Field of Classification Search .................. 370/360
See application file for complete search history.

(56) References Cited

U.S. PATENT DOCUMENTS

| | | | | |
|---|---|---|---|---|
| 4,517,562 | A | | 5/1985 | Martinez |
| 4,665,514 | A | | 5/1987 | Ching et al. |
| 4,723,285 | A | | 2/1988 | LeRoy et al. |
| 4,841,357 | A | | 6/1989 | Gillies |
| 4,845,658 | A | | 7/1989 | Gifford |
| 4,864,620 | A | | 9/1989 | Bialick |
| 5,096,195 | A | | 3/1992 | Gimmon |
| 5,129,036 | A | | 7/1992 | Dean et al. |
| 5,260,778 | A | | 11/1993 | Kauffman et al. |
| 5,303,326 | A | | 4/1994 | Dean et al. |
| 5,440,351 | A | * | 8/1995 | Ichino ........................ 348/729 |
| 5,515,098 | A | | 5/1996 | Carles |
| 5,557,541 | A | | 9/1996 | Schulhof et al. |
| 5,576,755 | A | | 11/1996 | Davis et al. |
| 5,697,844 | A | | 12/1997 | Von Kohorn |
| 5,715,018 | A | | 2/1998 | Fasciano et al. |
| 5,724,521 | A | | 3/1998 | Dedrick |
| 5,738,583 | A | | 4/1998 | Comas et al. |
| 5,948,061 | A | | 9/1999 | Merriman et al. |
| 5,999,808 | A | | 12/1999 | LaDue |
| 6,011,973 | A | | 1/2000 | Valentine et al. |
| 6,104,815 | A | | 8/2000 | Alcorn et al. |
| 6,167,382 | A | | 12/2000 | Sparks et al. |

(Continued)

FOREIGN PATENT DOCUMENTS

| | | | |
|---|---|---|---|
| CN | 1285079 | A | 2/2001 |

(Continued)

OTHER PUBLICATIONS

International Search Report dated Feb. 18, 2009 for PCT application PCT/US2008/060175.

(Continued)

*Primary Examiner*—Ayaz R Sheikh
*Assistant Examiner*—Hai-Chang Hsiung
(74) *Attorney, Agent, or Firm*—Wilson Sonsini Goodrich & Rosati

(57) ABSTRACT

A system including a plurality of software-controlled broadcast stations each having at least one media asset, and a controller to allow a user to link a first media asset of a first one of the stations to a second media asset of a second one of the stations. When the user schedules the first station to broadcast the first media asset at a specified time, the controller automatically causes the second station to broadcast the second media asset at the specified time.

14 Claims, 7 Drawing Sheets

U.S. PATENT DOCUMENTS

| | | | |
|---|---|---|---|
| 6,198,906 | B1 | 3/2001 | Boetje et al. |
| 6,212,392 | B1 | 4/2001 | Fitch et al. |
| 6,256,508 | B1 * | 7/2001 | Nakagawa et al. .......... 370/312 |
| 6,260,047 | B1 | 7/2001 | Fox et al. |
| 6,282,548 | B1 | 8/2001 | Burner et al. |
| 6,286,005 | B1 | 9/2001 | Cannon |
| 6,298,218 | B1 | 10/2001 | Lowe et al. |
| 6,311,214 | B1 | 10/2001 | Rhoads |
| 6,317,784 | B1 | 11/2001 | Mackintosh et al. |
| 6,338,043 | B1 | 1/2002 | Miller |
| 6,374,177 | B1 | 4/2002 | Lee et al. |
| 6,388,712 | B1 | 5/2002 | Shinohara et al. |
| 6,401,075 | B1 | 6/2002 | Mason et al. |
| 6,411,992 | B1 | 6/2002 | Srinivasan et al. |
| 6,416,414 | B1 | 7/2002 | Stadelmann |
| 6,470,180 | B1 | 10/2002 | Kotzin et al. |
| 6,502,076 | B1 | 12/2002 | Smith |
| 6,508,710 | B1 | 1/2003 | Paravia et al. |
| 6,509,867 | B1 | 1/2003 | McGibney |
| 6,527,638 | B1 | 3/2003 | Walker et al. |
| 6,527,641 | B1 | 3/2003 | Sinclair et al. |
| 6,606,745 | B2 | 8/2003 | Maggio |
| 6,628,928 | B1 | 9/2003 | Crosby et al. |
| 6,628,939 | B2 | 9/2003 | Paulsen |
| 6,650,892 | B1 | 11/2003 | Thiriet |
| 6,674,995 | B1 | 1/2004 | Meyers et al. |
| 6,678,501 | B1 | 1/2004 | Valeski |
| 6,701,355 | B1 | 3/2004 | Brandt et al. |
| 6,711,474 | B1 | 3/2004 | Treyz et al. |
| 6,725,022 | B1 | 4/2004 | Clayton et al. |
| 6,735,435 | B2 | 5/2004 | Newell et al. |
| 6,747,706 | B1 | 6/2004 | Geddes et al. |
| 6,767,284 | B1 | 7/2004 | Koza |
| 6,778,820 | B2 | 8/2004 | Tendler |
| 6,820,055 | B2 | 11/2004 | Saindon et al. |
| 6,820,277 | B1 | 11/2004 | Eldering et al. |
| 6,829,475 | B1 | 12/2004 | Lee et al. |
| 6,850,839 | B1 | 2/2005 | McGibney |
| 6,895,238 | B2 | 5/2005 | Newell et al. |
| 6,915,107 | B1 | 7/2005 | Lusk |
| 6,941,324 | B2 | 9/2005 | Plastina et al. |
| 6,952,559 | B2 | 10/2005 | Bates et al. |
| 6,957,041 | B2 | 10/2005 | Christensen et al. |
| 6,961,549 | B2 | 11/2005 | Mori |
| 6,963,910 | B1 | 11/2005 | Belknap et al. |
| 6,975,835 | B1 | 12/2005 | Lake et al. |
| 6,985,882 | B1 | 1/2006 | Del Soto |
| 7,036,136 | B1 | 4/2006 | Worthy |
| 7,039,930 | B1 | 5/2006 | Goodman et al. |
| 7,054,592 | B2 | 5/2006 | Tatsumi et al. |
| 7,069,582 | B2 | 6/2006 | Philyaw et al. |
| 7,085,732 | B2 | 8/2006 | Gould |
| 7,158,753 | B2 | 1/2007 | Kagan et al. |
| 7,167,454 | B2 | 1/2007 | Caldwell et al. |
| 7,349,663 | B1 | 3/2008 | Joseph |
| 2001/0003099 | A1 | 6/2001 | Von Kohorn |
| 2001/0018858 | A1 | 9/2001 | Dwek |
| 2001/0037304 | A1 | 11/2001 | Paiz |
| 2001/0048748 | A1 | 12/2001 | Van Ryzin |
| 2001/0051559 | A1 | 12/2001 | Cohen et al. |
| 2002/0023020 | A1 | 2/2002 | Kenyon et al. |
| 2002/0038455 | A1 | 3/2002 | Srinivasan et al. |
| 2002/0042923 | A1 | 4/2002 | Asmussen et al. |
| 2002/0049037 | A1 | 4/2002 | Christensen et al. |
| 2002/0056118 | A1 | 5/2002 | Hunter et al. |
| 2002/0059646 | A1 | 5/2002 | Kim |
| 2002/0069404 | A1 | 6/2002 | Copeman et al. |
| 2002/0092019 | A1 | 7/2002 | Marcus |
| 2002/0099600 | A1 | 7/2002 | Merriman et al. |
| 2002/0122052 | A1 | 9/2002 | Reich et al. |
| 2002/0133820 | A1 | 9/2002 | Arai et al. |
| 2002/0168967 | A1 | 11/2002 | Clapper |
| 2002/0178058 | A1 | 11/2002 | Ritchie et al. |
| 2002/0194215 | A1 | 12/2002 | Cantrell et al. |
| 2003/0003990 | A1 * | 1/2003 | Von Kohorn ................. 463/25 |
| 2003/0009452 | A1 | 1/2003 | O'Rourke et al. |
| 2003/0023489 | A1 | 1/2003 | McGuire et al. |
| 2003/0045273 | A1 | 3/2003 | Pyhalammi et al. |
| 2003/0069032 | A1 | 4/2003 | Jarvi et al. |
| 2003/0070167 | A1 | 4/2003 | Holtz et al. |
| 2003/0093530 | A1 | 5/2003 | Syed |
| 2003/0105809 | A1 | 6/2003 | Yoshii et al. |
| 2003/0119528 | A1 | 6/2003 | Pew et al. |
| 2003/0126616 | A1 * | 7/2003 | Dewa ......................... 725/112 |
| 2003/0139190 | A1 | 7/2003 | Steelberg et al. |
| 2003/0229559 | A1 | 12/2003 | Panttaja et al. |
| 2004/0024633 | A1 | 2/2004 | Whymark |
| 2004/0028388 | A1 | 2/2004 | Kataoka et al. |
| 2004/0038723 | A1 | 2/2004 | Schneier et al. |
| 2004/0064524 | A1 | 4/2004 | Van Steenbergen et al. |
| 2004/0087326 | A1 | 5/2004 | Dunko et al. |
| 2004/0093394 | A1 * | 5/2004 | Weber et al. ................ 709/219 |
| 2004/0103026 | A1 | 5/2004 | White |
| 2004/0117826 | A1 | 6/2004 | Karaoguz et al. |
| 2004/0127199 | A1 | 7/2004 | Kagan et al. |
| 2004/0198217 | A1 | 10/2004 | Lee et al. |
| 2004/0215515 | A1 | 10/2004 | Perry |
| 2004/0236864 | A1 | 11/2004 | Stevenson et al. |
| 2004/0244042 | A1 | 12/2004 | Billmaier |
| 2005/0015800 | A1 | 1/2005 | Holcomb |
| 2005/0020238 | A1 | 1/2005 | Eastman et al. |
| 2005/0021396 | A1 | 1/2005 | Pearch et al. |
| 2005/0039206 | A1 | 2/2005 | Opdycke et al. |
| 2005/0043020 | A1 | 2/2005 | Lipsanen et al. |
| 2005/0065806 | A1 | 3/2005 | Harik |
| 2005/0065844 | A1 | 3/2005 | Raj et al. |
| 2005/0090279 | A9 | 4/2005 | Witkowski et al. |
| 2005/0105725 | A1 | 5/2005 | Lee |
| 2005/0137958 | A1 | 6/2005 | Huber et al. |
| 2005/0198317 | A1 | 9/2005 | Byers |
| 2005/0227678 | A1 | 10/2005 | Agrawal et al. |
| 2005/0239402 | A1 | 10/2005 | Gioscia et al. |
| 2005/0265396 | A1 * | 12/2005 | Steelberg et al. ............ 370/486 |
| 2005/0267817 | A1 | 12/2005 | Barton et al. |
| 2005/0278769 | A1 | 12/2005 | Steelberg et al. |
| 2006/0019642 | A1 * | 1/2006 | Steelberg et al. ......... 455/414.3 |
| 2006/0133407 | A1 | 6/2006 | Kuisma |
| 2006/0143236 | A1 | 6/2006 | Wu |
| 2006/0146765 | A1 | 7/2006 | Van de Sluis et al. |
| 2006/0176374 | A1 * | 8/2006 | Oklejas .................. 348/211.8 |
| 2006/0195863 | A1 | 8/2006 | Whymark |
| 2006/0212901 | A1 | 9/2006 | Steelberg et al. |
| 2006/0218401 | A1 | 9/2006 | Jun |
| 2006/0248209 | A1 | 11/2006 | Chiu et al. |
| 2006/0268667 | A1 | 11/2006 | Jellison, Jr. et al. |
| 2006/0282533 | A1 | 12/2006 | Steelberg et al. |
| 2006/0294571 | A1 | 12/2006 | Moore et al. |
| 2007/0022459 | A1 | 1/2007 | Gaebel et al. |
| 2007/0027958 | A1 | 2/2007 | Haslam |
| 2007/0078712 | A1 | 4/2007 | Ott et al. |
| 2007/0078714 | A1 | 4/2007 | Ott et al. |
| 2007/0094042 | A1 | 4/2007 | Ramer et al. |
| 2007/0112630 | A1 | 5/2007 | Lau et al. |
| 2007/0118873 | A1 | 5/2007 | Houh et al. |
| 2007/0130012 | A1 | 6/2007 | Yruski et al. |
| 2007/0157261 | A1 | 7/2007 | Steelberg et al. |
| 2007/0245020 | A1 | 10/2007 | Ott |
| 2007/0250856 | A1 | 10/2007 | Leavens et al. |
| 2007/0259318 | A1 | 11/2007 | Harrison |
| 2008/0021710 | A1 | 1/2008 | Ho |
| 2008/0046948 | A1 | 2/2008 | Verosub |
| 2008/0077264 | A1 | 3/2008 | Irvin et al. |
| 2008/0208378 | A1 | 8/2008 | Booth et al. |
| 2008/0249982 | A1 | 10/2008 | Lakowske |

| | | | |
|---|---|---|---|
| 2008/0254741 | A1 | 10/2008 | Irvin |
| 2008/0255686 | A1 | 10/2008 | Irvin et al. |
| 2008/0256080 | A1 | 10/2008 | Irvin et al. |
| 2008/0256109 | A1 | 10/2008 | Irvin et al. |
| 2009/0019374 | A1 | 1/2009 | Logan et al. |
| 2010/0064338 | A1 | 3/2010 | Steelberg et al. |

FOREIGN PATENT DOCUMENTS

| | | |
|---|---|---|
| JP | 03-184486 | 8/1991 |
| JP | 05-284162 | 10/1993 |
| JP | 07-505028 | 6/1995 |
| JP | 09-018430 | 1/1997 |
| JP | 2000-244427 | 9/2000 |
| JP | 2002-368704 | 12/2002 |
| KR | 10-1997-0019597 A | 4/1997 |
| KR | 10-2001-0112410 A | 12/2001 |
| WO | WO 97/15999 A2 | 5/1997 |
| WO | WO 97/21183 | 6/1997 |
| WO | WO 97/15999 A3 | 7/1997 |
| WO | WO 97/34384 A1 | 9/1997 |
| WO | WO 99/49663 A1 | 9/1999 |
| WO | WO 01/35667 A1 | 5/2001 |
| WO | WO 02/01869 A1 | 1/2002 |
| WO | WO 02/25467 A1 | 3/2002 |
| WO | WO 02/27425 A2 | 4/2002 |
| WO | WO 02/27425 A3 | 5/2003 |
| WO | WO 2004/017163 A2 | 2/2004 |
| WO | WO 2004/017163 A3 | 11/2004 |

OTHER PUBLICATIONS

Zeff, R. and Aronson, B., "*Advertising on the Internet*," second edition, pp. 1-436 (1999).

Langheinrich, M., et al., "Unintrusive Customization Techniques for Web Advertising" NEC Corporation, C&C Media Research Laboratories. Japan [Online], [retrieved on Apr. 1, 2008]. Retrieved from the Internet <URL:http://web.archive.org/web/20000819020800/www.ccrl.com/adwiz/adwiz-www8.html>.

Adknowledge Primary Services, Customer Reference Guide. pp. 1-90, 2000.

Accipiter, Inc., "Accipiter announces Accipiter AdManager, a breakthrough in Internet advertising and marketing" [Online], [retrieved on Apr. 1, 2008]. Retrieved from the Internet <URL: http://web.archive.org/web/19980201092220/www.accipiter. com/press/releases/pr_adman10.htm> Sep. 9, 1996.

Engage Technologies, Accipiter, "Questions and Answers about using Accipiter AdManager with Engage Precision Profiles" [Online], [retrieved on Apr. 1, 2008]. Retrieved from the Internet <URL:http://web.archive.org/web/19990209022600/www.accipiter.com/products/admanager/adm_profilesfaq.htm> Feb. 9, 1999.

Engage Technologies, Accipiter, "AdManager Frequently Asked Questions." [Online], [retrieved Apr. 1, 2008]. Retrieved from the Internet <URL:http://web.archive.org/web/19990208222457/www.accipiter.com/products/admanager/adm_faq.htm> Feb. 8, 1999.

Aaddzz Brokers Web Ad Space Sales Between Advertisers & Publishers, "The Best Way to Buy and Sell Web Advertising Space," 1997. [online] Retrieved from the Internet: <URL:http://www.aaddzz.com>.

Adforce, User Guide Version 2.6, "A Complete Guide to AdForce," 1998.

AdKnowledge Corporate Information, Company Overview, [online retrieved Aug. 16, 2007] Retrieved from <URL:http://web.archive.org/web/19990128143110/www.adknowledge.com/corporate/index.html>.

Adknowledge Customers, i-traffic, [Online], [retrieved Aug. 16, 2007] Retrieved from the Internet: <URLhttp://web.archive.org/web/19990503093107/www.adknowledge.com/aksystem/profile_itraffic.html>.

ADWIZ by NEC, "The Artificial Intelligence Solution for Advertisement Targeting," [Online], [retrieved Apr. 1, 2008] Retrieved from the Internet: <URL:http://web.archive.org/web/20000816042946/http://www.ccrl.com/adwiz/>.

AdKnowledge, Inc., Campaign Manager, "Streamlines buying and trafficking while saving time and money," [Online], [retrieved Aug. 16, 2007] Retrieved from the internet: <URL:http://web. archive.org/web/19990221080152/www.adknowledge.com/aksystem/campaign.html>.

NEC Corporation, "ADWIZ Intelligent Advertisement Targeting,".

Information Access Technologies, Inc., Aaddzz Highlights: The Maximum Performance Ad Network, "Aaddzz brokers Web ad space between advertisers & publishers," 1997 [Online], [retrieved Apr. 15, 2008] Retrieved from the Internet: <URL:http://web.archive.org/web/19980130092746/www.aaddzz.com/pages/b-highlights>.

Information Access Technologies, Inc., "Introduction to Aaddzz," [Online], [retrieved Apr. 15, 2008] Retrieved from the Internet: <URL:http://web.archive.org/web/19980130092752/www.aaddzz.com/pages/b-intro>.

Information Access Technologies, Inc., "Aaddzz Publishers," [Online], [retrieved Apr. 15, 2008] Retrieved from the Internet: <URL:http://web.archive.org/web/19980130092758/www.aaddzz.com/pages/b-publish>.

Information Access Technologies, Inc., "Aaddzz Advertisers," [Online], [retrieved Apr. 15, 2008] Retrieved from the Internet: <URL:http://web.archive.org/web/19980130092804/www.aaddzz.com/pages/b-advertise>.

Information Access Technologies, Inc., Aaddzz Ads, Spaces, & Places [Online], [retrieved Apr. 14, 2008] Retrieved from the Internet: <URL:http://web.archive.org/web/19980130092810/www.aaddzz.com/pages/b-adspacesplaces>.

Information Access Technologies, Inc., "Aaddzz Real-Time Reporting & Statements," [Online], [retrieved Apr. 15, 2008] Retrieved from the Internet: <URL:http://web.archive.org/web/19980130092816/www.aaddzz.com/pages/b-realtime>.

Information Access Technologies, Inc., "Aaddzz Buying Ad Space with Aaddzz," [Online], [retrieved Apr. 15, 2008] Retrieved from the Internet: <URL:http://web.archive.org/web/19980130092822/www.aaddzz.com/pages/advertising>.

Information Access Technologies, Inc., "Aaddzz Selling Ad Space With Aaddzz," [Online], [retrieved Apr. 15, 2008] Retrieved from the Internet: <URL:http://web.archive.org/web/19980130092829/www.aaddzz.com/pages/selling>.

Information Access Technologies, Inc., "Aaddzz Fees and Payments," [Online], [retrieved Apr. 15, 2008] Retrieved from the Internet: <URL:http://web.archive.org/web/19980130092836/www.aaddzz.com/pages/pricing>.

Information Access Technologies, Inc., "Aaddzz Ratings," [Online], [retrieved Apr. 15, 2008] Retrieved from the Internet: <URL:http://web.archive.org/web/19980130092842/www.aaddzz.com/pages/ratings>.

Information Access Technologies, Inc., "Aaddzz Ad Sizes," [Online], [retrieved Apr. 15, 2008] Retrieved from the Internet: <URL:http://web.archive.org/web/19980130092848/www.aaddzz.com/pages/sizes>.

Information Access Technologies, Inc., "Aaddzz Free Access Reports," [Online], [retrieved Apr. 15, 2008] Retrieved from the Internet: <URL:http://web.archive.org/web/19980130092902/www.aaddzz.com/pages/reports>.

Information Access Technologies, Inc., "Aaddzz Advanced Topics," [Online], [retrieved Apr. 15, 2008] Retrieved from the Internet: <URL:http://web.archive.org/web/19980130092908/www.aaddzz.com/pages/advanced>.

Information Access Technologies, Inc., "Aaddzz Frequently Asked Questions," [Online], [retrieved Apr. 15, 2008] Retrieved from the Internet: <URL:http://web.archive.org/web/19980130092914/www.aaddzz.com/pages/faq>.

Information Access Technologies, Inc., "Aaddzz Home Page," [Online], [retrieved Apr. 15, 2008] Retrieved from the Internet: <URL:http://www.aaddzz.com/letter.html>.

NEC Corportion, NEC: Press Release "NEC announces ADWIZ, an Artificial Intelligence Solution for Advertisement Targeting Software on the World Wide Web," Jan. 8, 1999.

AdKnowledge Inc., "Comprehensive Planning," [Online], [retrieved on Aug. 16, 2007] Retrieved from the Internet: <URL:http://web.archive.org/web/19990221144457/www.adknowledge.com/aksystem/planner.html>.

AdKnowledge Inc., “Automates the targeting and serving of web advertising campaigns,” [Online], [retrieved on Aug. 16, 2007] Retrieved from the Internet: <URL:http://web.archive.org/web/19990222023416/www.adknowledge.com/aksystem/smartbanner.html>.

IEEE Intelligent Systems, New Products, “Tell your computer where to go,” United Kingdom, Jan./Feb. 1998.

AdKnowledge Inc., “The AdKnowledge System,” [Online], [retrieved on Aug. 16, 2007] Retrieved from the Internet: <URL:http://web.archive.org/web/19990221115917/www.adknowledge.com/aksystem/index.html>.

AdKnowledge Inc., Corporate Information “AdKnowledge Events,” [Online], [retrieved on Aug. 16, 2007] Retrieved from the Internet: <URL:http://web.archive.org/web/20000511005235/www.adknowledge.com/whatsnew/events.html>.

NEC Corporation, ADWIZ White Paper, “Taking Online Ad Targeting to the Next Level,” [Online], [retrieved on Apr. 15, 2008] Retrieved from the Internet: <URL:http://web.archive.org/web/20010619222015/www.ccrl.com/adwiz/whitepaper.html>.

ScanScout, “ScanScout in the News,” [Online], [retrieved Apr. 16, 2008]. Retrieved from the Internet: <URL:http://scanscout.com/>.

Blinkx, “Video Search Engine—Blinkx,” [Online], [retrieved Apr. 16, 2008]. Retrieved from the Internet: <URL:http://blinkx.com/>.

EveryZing, Inc., “Video SEO and Multimedia Search Solutions,” [Online], [retrieved Apr. 16, 2008], Retrieved from the Internet: <URL:http://everyzing.com/>.

Inside Online Video, “Blinkx to Contextualize Video Ads Through Speech Recognition,” Jun. 22, 2007 [Online], [retrieved Apr. 16, 2008] Retrieved from the Internet: <URL:http://www.insideonlinevideo.com/20007/06/22/blinkx-to-contextualize-video-ads-through-speech-recognition/>.

“By Using Multicast, Wireless Communication, New Information Can Be Distributed,” Nikkei Internet Technology, Sep. 22, 1997, pp. 106-111, vol. 3. (in Japanese, see explanation).

“Eonstreams, Advertise with us!,” Eonstreams, Inc., 2006, 1 page, [online] [retrieved on Apr. 28, 2006] Retrieved from the Internet: <URL: http://www.eonstreams.com/Advertisers.htm>.

“Eonstreams, advertising . . . ,” Eonstreams, Inc., 2004, 1 page, [online] [retrieved on Apr. 7, 2005] Retrieved from the Internet: <URL: http://www.eonstreams.com/ServicesAdv.htm>.

“Eonstreams, be on eon!,” Eonstreams, Inc., 2004, 1 page, [online] [retrieved on Apr. 7, 2005] Retrieved from the Internet: <URL: http://www.eonstreams.com/>.

“Eonstreams, Better together . . . ,” Eonstreams, Inc., 2006, 1 page, [online] [retrieved on May 22, 2006] Retrieved from the Internet: <URL: http://www.eonstreams.com/>.

“Eonstreams, case studies . . . ,” Eonstreams, Inc., 2004, 2 pages, [online] [retrieved on Apr. 7, 2005] Retrieved from the Internet: <URL: http://www.eonstreams.com/SamplesCase.htm>.

“Eonstreams, clients love us . . . ,” Eonstreams, Inc., 2004, 1 page, [online] [retrieved on Apr. 7, 2005] Retrieved from the Internet: <URL: http://www.eonstreams.com/Testimonials.htm>.

“Eonstreams, FAQs,” Eonstreams, Inc., Mar. 3, 2006, 7 pages, [online] [retrieved on Apr. 28, 2006] Retrieved from the Internet: <URL: http://www.eonstreams.com/HowToFaqs.htm>.

“Eonstreams, Inc. Secures Financing to Deploy Revolutionary Ad Insertion Capability,” Source Eonstreams, Inc., Mar. 29, 2005, 2 Pages, [online] [retrieved on Apr. 8, 2005] Retrieved from the Internet: <URL: http://www.prnewswire.com/cgi-bin/stories.pl?ACCT=104&STORY=/www/story/03-29-2005/0003288...>.

“Eonstreams, Kevin Woods, CTO,” Eonstreams, Inc., 2004, 1 page, [online] [retrieved on Apr. 7, 2005] Retrieved from the Internet: <URL: http://www.eonstreams.com/CoInfoCTO.htm>.

“Eonstreams, pay-per-view . . . ,” Eonstreams, Inc., 2004, 1 page, [online] [retrieved on Apr. 7, 2005] Retrieved from the Internet: <URL: http://www.eonstreams.com/ServicesPPV.htm>.

“Eonstreams, Press releases . . . ,” Eonstreams, Inc., Feb. 2, 2006, 6 pages, [online] [retrieved on Apr. 28, 2006] Retrieved from the Internet: <URL: http://www.eonstreams.com/PressReleases.htm>.

“Eonstreams, Steve Newman, CEO,” Eonstreams, Inc., 2004, 1 page, [online] [retrieved on Apr. 7, 2005] Retrieved from the Internet: <URL: http://www.eonstreams.corn/CoInfoCEO.htm>.

“Eonstreams, streaming . . . ,” Eonstreams, Inc., 2004, 1 page, [online] [retrieved on Apr. 7, 2005] Retrieved from the Internet: <URL: http://www.eonstreams.com/ServicesStreaming.htm>.

“Eonstreams, Streaming . . . ,” Eonstreams, Inc., 2006, 1 page, [online] [retrieved on Apr. 28, 2006] Retrieved from the Internet: <URL: http://www.eonstreams.com/Streaming.htm>.

“Eonstreams, subscription . . . ,” Eonstreams, Inc., 2004, 1 page, [online] [retrieved on Apr. 7, 2005] Retrieved from the Internet: <URL: http://www.eonstreams.com/ServicesSub.htm>.

“Eonstreams, Susan Seagraves, CFO,” Eonstreams, Inc., 2004, 1 page, [online] [retrieved on Apr. 7, 2005] Retrieved from the Internet: <URL: http://www.eonstreams.com/CoInfoCFO.htm>.

“Eonstreams, testimonials, 650WSM Nashville’s Country Legend!, WSM | Citadel Broadcasting Corporation,” Eonstreams, Inc., 2004, 1 page, [online] [retrieved on Apr. 7, 2005] Retrieved from the Internet: <URL: http://www.eonstreams.com/TestimonialsWSM.htm>.

“Eonstreams, testimonials, Citadel Communications Corporation, WSM | Citadel Broadcasting Corporation,” Eonstreams, Inc., 2004, 2 pages, [online] [retrieved on Apr. 7, 2005] Retrieved from the Internet: <URL: http://www.eonstreams.com/TestimonialsCitadel.htm>.

“Eonstreams, Tools . . . ,” Eonstreams, Inc., 2006, 1 page, [online] [retrieved on Apr. 28, 2006] Retrieved from the Internet: <URL: http://www.eonstreams.com/How_To_ Tools.htm>.

“Eonstreams, total solutions . . . ,” Eonstreams, Inc., 2004, 1 page, [online] [retrieved on Apr. 7, 2005] Retrieved from the Internet: <URL: http://www.eonstreams.com/Services.htm>.

“Eonstreams, what we do . . . ,” Eonstreams, Inc., 2004, 1 page, [online] [retrieved on Apr. 7, 2005] Retrieved from the Internet: <URL: http://www.eonstreams.com/Samples.htm>.

“Eonstreams, Who we are . . . ,” Eonstreams, Inc., 2006, 1 page, [online] [retrieved on Apr. 28, 2006] Retrieved from the Internet: <URL: http://www.eonstreams.com/About_Us.htm>.

“Eonstreams, WIVK Knoxville, TN . . . ,” Eonstreams, Inc., 2004, 1 page, [online] [retrieved on Apr. 7, 2005] Retrieved from the Internet: <URL: http://www.eonstreams.com/SamplesDemosWIVK.htm>.

“Eonstreams, Z100, NY . . . ,” Eonstreams, Inc., 2004, 1 page, [online] [retrieved on Apr. 7, 2005] Retrieved from the Internet: <URL: http://www.eonstreams.com/SamplesDemosZ100.htm>.

“MediaSpan Online Services Partners With Eonstreams,” EContentMag.com, Feb. 3, 2006, 3 pages, [online] [retrieved on Apr. 28, 2006] Retrieved from the Internet: <URL: http://www.econtentmag.com/Articles/ArticleReader.aspx?ArticleID=15031>.

“NAB2005—The World’s Largest Electronic Media Show,” National Association of Broadcasters, 2005, 2 pages, [online] [retrieved on Apr. 28, 2006] Retrieved from the Internet: <URL: http://www.nabshow.com/exhibitors/NAB2005/company.asp?id=11150>.

“Streaming Audio and Video Development and Media Hosting Solutions,” VitalStrearn, Inc., 2000-2006, 1 page, [online] [retrieved on May 22, 2006] Retrieved from the Internet: <URL: http://www.vitalstream.com/about/index.html.>.

“VitalStream Acquires Eonstreams to Provide Comprehensive Online Advertising Solutions,” VitalStream, Press Release, May 22, 2006, 3 pages, [online] [retrieved on May 22, 2006] Retrieved from the Internet: <URL: www.vitalstream.com/news/release-05-22-06.html>.

DSP-32C Brochure, Ariel Corporation, 433 River Road, Highland Park, NJ 08904, (201) 249-2900, May 1, 1989.

European Patent Office: Supplementary European Search Report for International Application No. PCT/US2005/016405 (6 pages). Munich, Germany. Sep. 18, 2008.

International Search Report and the Written Opinioin of the International Searching Authority, or the Declaration; PCT/US2006/047944, dated Nov. 6, 2008.

International Search Report and the Written Opinion of the Int’l Searching Authority, or the Declaration. Int’l application No. PCT/US 06/47944, form PCT/ISA/220 dated Apr. 24, 2008.

International search report and written opinion in Application No. PCT/US2008/059898, dated Aug. 14, 2008.

International Search Report and Written Opinion, PCT International Patent Application No. PCT/US06/09797 dated Aug. 23, 2007.

International Search Report and Written Opinion, PCT US06-09349 dated Jun. 9, 2008.
International Search Report and Written Opinion, PCT/US06/09401 dated Sep. 22, 2006.
International Search Report and Written Opinion, PCT/US06/19096 dated Apr. 30, 2007, 7 pages.
International Search Report and Written Opinion, PCT/US06/28483 dated Jul. 18, 2007.
International search report dated Feb. 24, 2009 for PCT Application No. US2008/60169.
International search report dated Sep. 16, 2008 for PCT Application No. US2008/60088.
International Search Report, dated Feb. 12, 2008 for PCT/US2007/079088.
International Search Report, PCT/US02/04769 dated Jul. 23, 2002.
International Search Report, PCT/US02/19983 dated Oct. 18, 2002.
International search reported dated Sep. 26, 2008 for PCT Application No. US2008/60024.
International Searching Authority Written Opinion, dated Feb. 12, 2008 for PCT/US2007/079088.
Kumar, Shreyas, Patent Examination for Australian Patent Application No. 2006227730, in Examination Report mailed May 22, 2009.
MM-96 Brochure, Ariel Corporation, 1990.
SX-10 Brochure, Antex Electronics, Mar. 1989.
Windows XP Media Center Edition 2004 Review. Available at http://www.winsupersite.com/reviews/windowsxp_mce2004.asp Sep. 30, 2003. Accessed Jan. 12, 2009.
European search report dated May 27, 2010 for Application No. 2742282.3.

* cited by examiner

MULTI-STATION MEDIA CONTROLLER

CROSS REFERENCE TO RELATED APPLICATIONS

This application is related to U.S. patent application Ser. No. 11/735,380, titled "Leader and Follower Broadcast Stations," , filed concurrently with the present application, the contents of which are incorporated by reference.

BACKGROUND

This document relates to management of broadcast systems.

Broadcast stations, such as over-the-air radio stations or Internet radio stations, broadcast or stream audio programs according to a playlist. In some examples, the broadcast stations are controlled by software executed on a computer system, in which digitally stored audio recordings are sent to transmitters according to the playlist. Each station is controlled by a computer that provides a graphical user interface to allow a producer or disc jockey (DJ) to modify the playlist of the station. In some examples, when multiple stations participate in a simultaneous broadcast (or "simulcast"), the playlists on the computers are individually configured so that the stations broadcast the same audio programs.

SUMMARY

In one aspect, in general, a system including a plurality of software-controlled broadcast stations each having at least one media asset, and a controller to allow a user to link a first media asset of a first one of the stations to a second media asset of a second one of the stations. When the user schedules the first station to broadcast the first media asset at a specified time, the controller automatically causes the second station to broadcast the second media asset at the specified time.

Implementations of the system may include one or more of the following features. The first and second media assets include jingles. One of the stations operates as a leader station, and another of the stations operates as a follower station during a simulcast. The follower station controls a switch to forward a signal representing a common program from the leader station to a signal modulator associated with the follower station during a first time period, and to forward a signal representing the second media asset from the follower station to the signal modulator during a second time period. The controller allows the user to link the first media asset of the first station to a media asset of each of the other stations, such that when the user schedules the first station to broadcast the first media asset at a specified time, the controller automatically causes all other stations to broadcast respective media assets linked to the first media asset at the specified time.

In some examples, the software-controlled broadcast stations include software-controlled radio stations. In some examples, the software-controlled broadcast stations stream programs over a network. The system includes a user interface to allow a user to select which of the media assets to be linked together. The system includes a database storing information about which media assets are linked together.

In another aspect, in general, a system includes a software-controlled leader station associated with a first media asset, and a software-controlled follower station associated with a second media asset that is linked to the first media asset. The follower station monitors media assets played by the leader station, such that when the leader station plays the first media asset, the follower station automatically plays the second media asset.

Implementations of the system may include one or more of the following features. The software-controlled broadcast stations include software-controlled radio stations.

In another aspect, in general, a computer-implemented method includes linking a first media asset of a first software-controlled broadcast station to a second media asset of a second software-controlled broadcast station, providing a user interface to allow a user to schedule broadcast of the first media asset at a specified time by the first station, and automatically causing the second media asset to be broadcast by the second station at the specified time.

Implementations of the method may include one or more of the following features. The second media asset is broadcast by the second station at the specified time without input from the user regarding when to broadcast the second media asset. The first and second media assets includes jingles. The method includes designating the first station as a leader station and the second station as a follower station during a simulcast. The method includes controlling a switch associated with the follower station to forward a signal representing a common program from the leader station to a signal modulator associated with the follower station during a first time period, and to forward a signal representing the second media asset from the follower station to the signal modulator during a second time period. The method includes providing a second user interface to allow the user to select which of the media assets to be linked together. In some examples, the method includes broadcasting radio frequency signals associated with the first and second media assets. In some examples, the method includes streaming data packets associated with the first and second media assets over a network. The method includes executing parallel processes to implement the software-controlled broadcast stations, each process corresponding to one of the stations.

In another aspect, in general, a computer-implemented method includes providing a user interface to allow a user to link media assets of different stations such that during a simultaneous broadcast, when one of the stations operating in a leader mode plays a media asset that is linked to other media assets of other stations, the other stations automatically play respective media assets.

In another aspect, in general, a system includes means for linking a first media asset of a first software-controlled broadcast station to a second media asset of a second software-controlled broadcast station, means for allowing a user to schedule broadcast of the first media asset at a specified time by the first station, and means for causing the second media asset to be broadcast by the second station at the specified time without input from the user regarding when to broadcast the second media asset.

The disclosed systems and techniques may provide one or more of the following advantages. The system allows a user (e.g., a program producer or a DJ) to manage multiple broadcast stations that join in a simulcast. The user can play station jingles spontaneously on multiple stations during the simulcast and cause each station plays its own distinct jingle. The system allows the user to have different stations broadcast respective jingles simultaneously without spending manual effort to individually schedule and synchronize the jingles in the playlists of different broadcast stations. Graphical user interfaces are provided to enable the user to search for media assets and select which media assets to link together.

The details of one or more implementations are set forth in the accompanying drawings and the description below. Other features, aspects, and advantages will be apparent from the description and drawings, and from the claims.

DESCRIPTION OF DRAWINGS

Like reference symbols in the various drawings indicate like elements.

DETAILED DESCRIPTION

Figure 1:
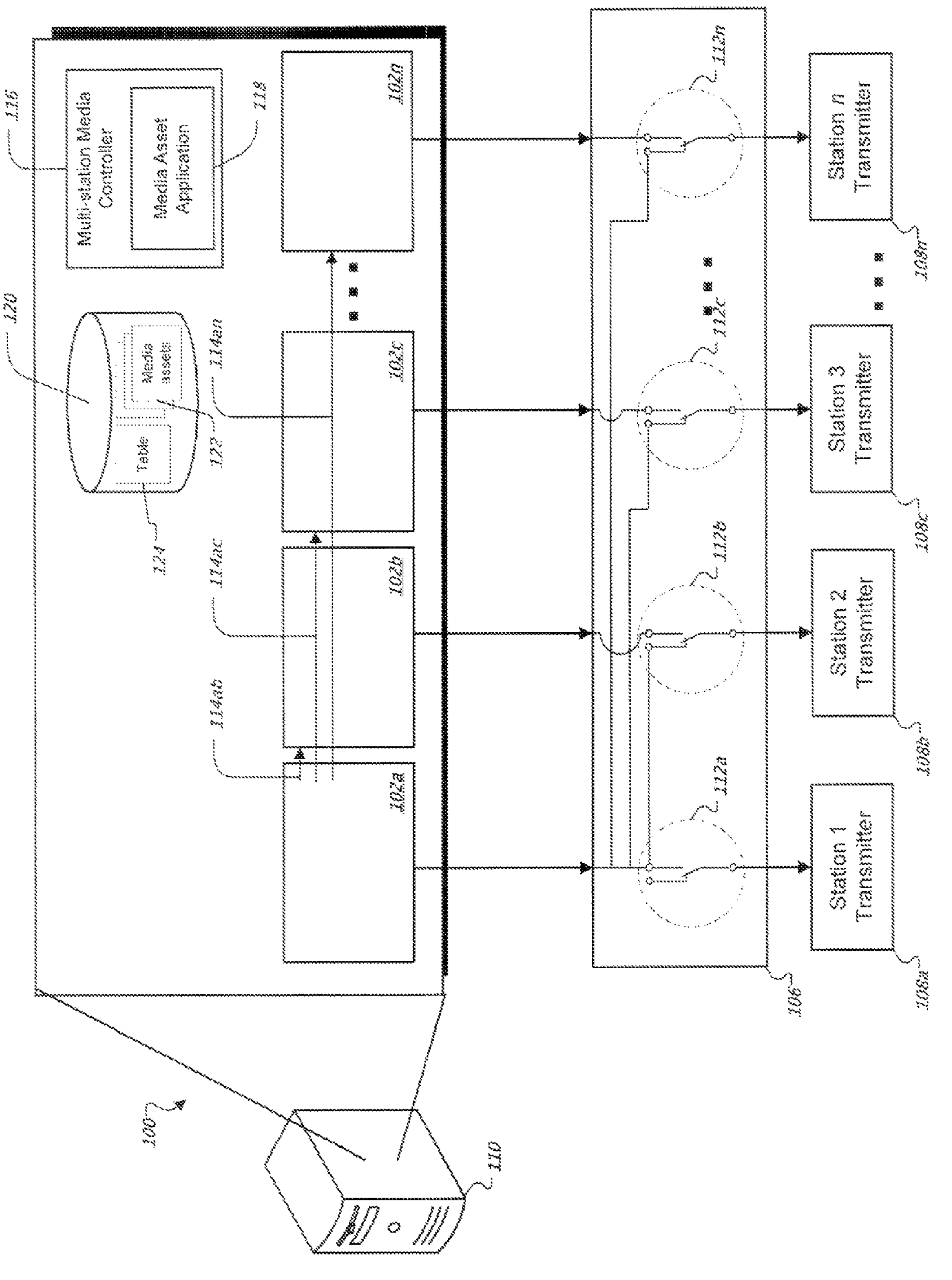
FIG. 1 is a schematic diagram of a broadcast system.

FIG. 1 is a schematic diagram of an example of a broadcast system 100 that includes a plurality of software-controlled broadcast stations 102*a* to 102*n*, collectively referenced as 102. The broadcast stations 102 are controlled by software executing on a workstation 110. The broadcast stations 102 can perform a simulcast in which different stations 102 broadcast the same programs, except for certain periods (e.g., commercial breaks) in which each station may broadcast its own content. The system 100 allows a producer or DJ to designate one station (e.g., 102*a*) as a "leader station" and other stations (e.g., 102*b* to 102*n*) as "follower stations." The system 100 also allows the producer to link media assets (e.g., station jingles) of different stations 102 to form a "multi-station media asset," such that when the media asset of the leader station is played, the system 100 automatically (that is, without further user input) controls the follower stations to play respective linked media assets.

For example, commercials can be pre-scheduled so that planned commercial breaks occur at planned times. The producer schedules the programs and commercials to be played on the leader station, and the commercials to be played on the follower stations. The system 100 automatically controls the follower stations to play the same programs as the leader station, except during certain periods, such as commercial breaks, in which the system 100 controls each follower station to play its respective commercial. In this description, the content that is simultaneously broadcast by different stations is referred to as "simulcast content" (or "common program"), and the content specific to each station is referred to as "local content."

Some items that are broadcast by the stations 102 may not be planned, e.g., jingles. A DJ may use station jingles to provide the station call letters and/or numbers, geographical area (e.g., "serving Anaheim"), frequency (e.g., "107.3 FM"), or other station identification. The DJ has the option of playing a jingle spontaneously, at any time during the broadcast, depending on the flow of programs. It may be difficult to schedule jingles on the playlists of multiple broadcast stations 102.

A feature of the system 100 is that it includes a multi-station media controller 116 that allows the DJ to conveniently link jingles of different stations, so that when the DJ decides to play jingles at the leader and follower stations at a particular time, the DJ can just add a jingle to the playlist of the leader station. The system 100 automatically causes the linked jingles to be played at the follower stations. This way, the DJ can have different stations broadcasting respective jingles simultaneously without spending manual effort to individually schedule and synchronize the jingles in the playlists of different broadcast stations 102.

The multi-station media controller 116 includes a media asset application 118 that provides a graphics user interface to allow a user (e.g., producer or DJ) to search for media assets, associate media assets with stations 102, and determine which media assets are linked together. The linking of jingles or media assets can be performed, e.g., well in advance of air time.

The system 100 includes a switching network 106 that includes switches 112*a* to 112*n*, collectively referenced as 112. Each switch 112 is controlled by a broadcast station 102. Each switch 112 has an input that receives broadcast signals (i.e., signals representing the simulcast content or the local content) from the broadcast station 102 associated with the switch 112, and inputs that receive broadcast signals from the other broadcast stations 102. Each switch 112 has an output that is electrically connected to a transmitter (e.g., 108*a* to 108*n*, collectively referenced as 108).

The switching network 106 can be separate from the workstation 110, and can be placed at a location different from where the workstation 110 is located (e.g., different rooms or buildings). The workstation 110 can have control logic for controlling the switching network 106. The switching network 106 can also be distributed across different rooms or buildings.

In the example of FIG. 1, the broadcast station 102*a* is selected as a leader station, and the broadcast stations 102*b* to 102*n* are selected as follower stations. FIG. 1 shows a simplified version of the switching network 106 in which the switch 112*a* forwards simulcast content from the leader station 102*a* to the transmitter 108*a*. The switch 112*b* switches between receiving simulcast content from the leader station 102*a* and receiving local content from the follower station 102*b*. The switch 112*n* switches between receiving simulcast content from the leader station 102*a* and receiving local content from the follower station 102*n*, and so forth. Any of the broadcast stations 102 can be selected to be a leader station, so each switch 112 is configured to be capable of switching between receiving signals from the station associated with the switch and any other station.

In examples where the programs are broadcast through the airwaves, each of the software-controlled broadcast stations 102 can be associated with a physical broadcast station (which may have, e.g., hardware equipment and/or supporting staff), in which the programs to be broadcast by the physical broadcast station are controlled by the corresponding broadcast station 102. Each broadcast station 102 can be associated with a physical station that is situated at a location that is the same as or different from where the workstation 110 is located.

For example, different broadcast stations 102 may be associated with different base frequencies. Different broadcast stations 102 may service geographical regions that overlap one another, or regions that are apart from one another. For example, the transmitter 108*a* may transmit the signals to a broadcast module (which includes, e.g., amplifiers, radio frequency modulators, antennas) located at a first location, in which the broadcast module broadcasts the signals at a first base frequency. The transmitter 108*b* may transmit the signals from the station 102*b* to a broadcast module located at a second location, in which the broadcast module broadcasts the signals at a second base frequency, and so forth. For example, the stations 102 can each be associated with a base frequency in the range of 520 to 1,710 kHz for AM broadcasts, 87.9 to 107.9 MHz for FM broadcasts, or other frequencies.

The broadcast system 100 is useful in servicing, e.g., radio stations that play the same overall programs (e.g., music, news, talk shows), but have different station identification, such as different call letters and/or numbers, different frequencies, and may serve different geographical areas. The radio stations may also play different commercials (or local news clips) that are targeted toward local preferences. The system 100 allows the producer or DJ to easily manage which programs to be played as simulcast content, which commercials to play at respective stations during commercial breaks, and which jingles to play at respective stations whenever the DJ decides to play a jingle at the leader station.

In examples where the broadcast stations 102 are Internet radio stations, different broadcast stations 102 may be associated with different Universal Resource Locators (URLs). Different broadcast stations 102 may provide different audio streams that can be transmitted over the web. Each transmitter 108 may transmit the signals to a network gateway that converts the signals into data packets that can be transmitted over the Internet.

In some examples, some of the broadcast stations 102 are over-the-air radio stations, and some of the broadcast stations 102 are Internet radio stations. Thus, the broadcast system 100 can simultaneously control programs that that are broadcast through the airwaves and programs that are transmitted over the Internet. For example, the leader station may be either an over-the-air radio station or an Internet radio station. The follower stations can be over-the-air radio stations, Internet radio stations, or a combination of both.

In some examples, the workstation 110 includes a media asset repository 120 for storing media assets 122 that can be played by the broadcast stations 102. The media assets 122 may include recordings of, e.g., music, news, talk shows, station jingles, etc. Each media asset 122 is associated with a media asset number. When the producer schedules the playlist for a station, the producer inserts the media assert numbers of the programs to be played into time slots on the playlist. The station 102 then plays the media assets 122 at the scheduled times according to the playlist.

The media asset repository 120 may store media assets 122 in various formats, such as Resource Interchange File Format (RIFF), Waveform (WAV) audio format, Interchange File Format (IFF), or any other file format that can be processed by the system 100. The media asset repository 120 may also store a table 124 having information about which media assets are linked together.

The programs played by the broadcast stations 102 can be, e.g., a music program (e.g., selected from a play list or based on listeners' requests), a talk show (e.g., one or more radio personalities discussing current events), a news show, a lecture, an audio blog, a podcast, or a recording from an audio book. The programs can be in standard definition or high definition.

The stations 102 can transmit region specific content (e.g., advertisements) or station specific content, such as station jingles, which can be used to provide the station call letters and/or numbers, geographical area (e.g., "serving Anaheim"), frequency (e.g., "107.3 FM"), or other station identification.

Generally, simulcast content is divided into segments. Region specific content, station specific content, or both can be played between segments of the simulcast content. For example, an hour-long radio talk show can be split into three segments, where each segment break can include, e.g., advertisements, station jingles, and/or public service announcements.

In some examples, the leader station 102*a* coordinates the simulcast with the follower stations 102*b* to 102*n*. The playlist on the leader station 102 includes codes that indicate when a segment of the simulcast content ends so that the follower stations can breakaway and broadcast local content, and when the next segment of the simulcast content begins so that the follower stations should rejoin and broadcast the simulcast content.

In some examples, the leader station 102*a* sends instructions (e.g., 114*ab*, 114*ac*, and 114*an*) to all the follower stations (e.g., 102*b*, 102*c*, and 102*n*) to indicate when the follower stations can break away from or rejoin the simulcast.

In some examples, the leader station 102*a* broadcasts the simulcast content, and the follower stations 102*b* to 102*n* listen to the leader station 102*a* and rebroadcast the simulcast content through respective transmitters 108*b* to 108*n*. When an independent programming period (e.g., a segment break) occurs, the leader station 102*a* sends a "breakaway" signal to the follower stations 102*b* to 102*n*, indicating that an independent programming period is to start, and provides information about the length of the independent programming period. The term "independent program period" refers to a time interval or event when the follower station is broadcasting local content independent of the leader station.

Upon receiving a breakaway signal, the follower stations 102*b* to 102*n* broadcast local content (e.g., region or station specific content) during the length of independent program period specified by the leader station 102*a*. After the independent program period has passed, the follower stations 102*b* to 102*n* rejoin the simulcast and broadcast the simulcast content originating from the leader station 102*a*.

Instead of sending the length of the programming period, the leader station 102*a* can also send a "rejoin" signal to the follower stations 102*b* to 102*n* at the end of the independent program period to indicate that the follower stations 102*b* to 102*n* should rejoin the simulcast.

In some examples, switching between the simulcast content and the local content can be achieved using the switching network 106. In some examples, the follower stations 102*b* to 102*n* can mute the leader station's 102*a* signal when the follower stations 102*b* to 102*n* transmit their respective local content. The follower stations 102*b* to 102*n* can mute their own broadcast when they rebroadcast the signal of the leader station 102*a*.

In some examples, a control module (not shown) is used to control the leader station 102*a* and the follower stations 102*b* to 102*n* during the simulcast. The control module monitors the content being played on the playlist of the leader station 102*a*, and informs the follower stations 102*b* to 102*n* when to break away from the simulcast and when to rejoin. Instead of listening to the leader station and re-broadcasting the simulcast content provided by the leader station 102*a*, the follower stations 102*b* to 102*n* may receive media asset numbers of the simulcast content and play media assets based on the media asset numbers.

Figure 2:
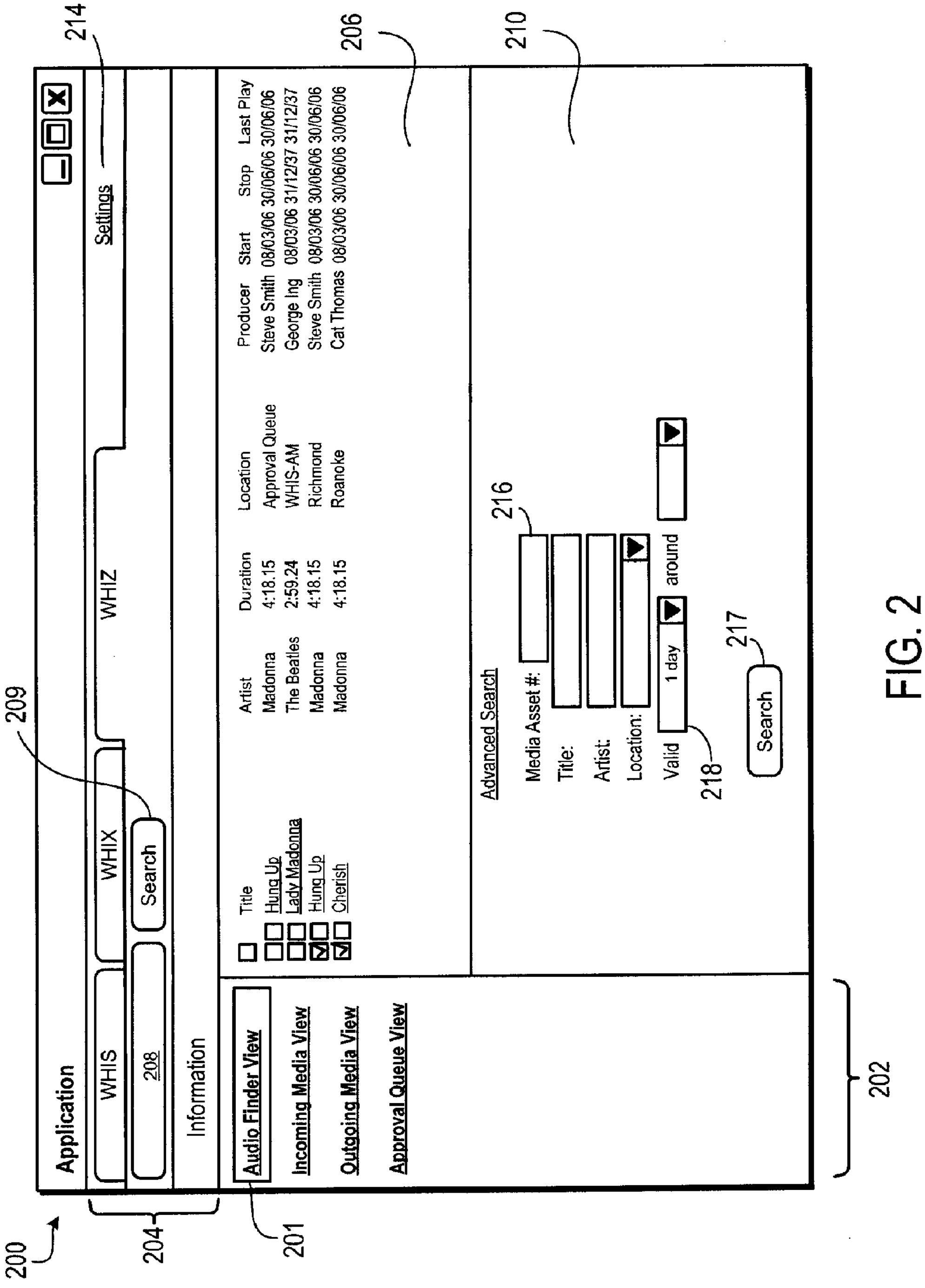
FIG. 2 is a screen shot of a graphical user interface.

FIG. 2 is a screen shot of an example of a graphical user interface (GUI) 200 provided by the media asset application 118 to enable a user to search for media assets 122. The GUI 200 includes a view area 202, a menu area 204, and a result display area 206. The view area 202 includes selectable views pertaining to types of media assets 122 that are available. The selectable views include, e.g., an audio finder view, an incoming media view, an outgoing media view, and an approval queue view. The columns of information shown in result display area 206 are arranged based on the view selected by the user.

The menu area 204 includes a text field 208, an advanced search area 210, and a settings area 214. The user can enter a search string, such as the title or artist name of the media asset, into the text field 208, and click on a search button 209 to perform a basic keyword search. The search may return search results (e.g., media assets) in the display area 206. In some cases, the search results may display the title of a media item as a selectable hyperlink, and the user may select the hyperlink to display additional data about the media asset.

The advanced search area 210 may used to initiate an advanced search for media assets 122. For example, the user may enter a text string or value for a title, artist, and/or location. The system searches for media assets 122 containing the user-specified text strings or values in the respective fields. The search result may be shown in the result display area 206.

The advanced search area 210 may include a media asset number search box 216 where the user can search for a specific media asset 122 based on its media asset number. A valid time slot tool 218 is provided to allow the user to search for media assets 122 that were played or expect to be played in a particular valid time slot.

The GUI 200 includes a message area 212 for display messages to provide feedback to the user before, during, or after search queries. For example, message area 212 may provide the user with help information, error information about an attempted search, or information about searches being performed.

The GUI 200 includes a settings area 214 for setting up an advanced search screen. For example, the user may select settings area 214 to customize the advanced search screen. The settings area 214 may also include controls operable to customize and/or modify column header information in the result display area 206. For example, more data columns can be added by customizing the result display area 206. In some examples, the user may drag the columns within the display area 206 to rearrange the order of the columns. The columns may be selected to sort media asset information according to a selected attribute. The result display area 206 can display various types of media asset attributes, such as media asset location, data type, song information, and/or identification number.

Figure 3:
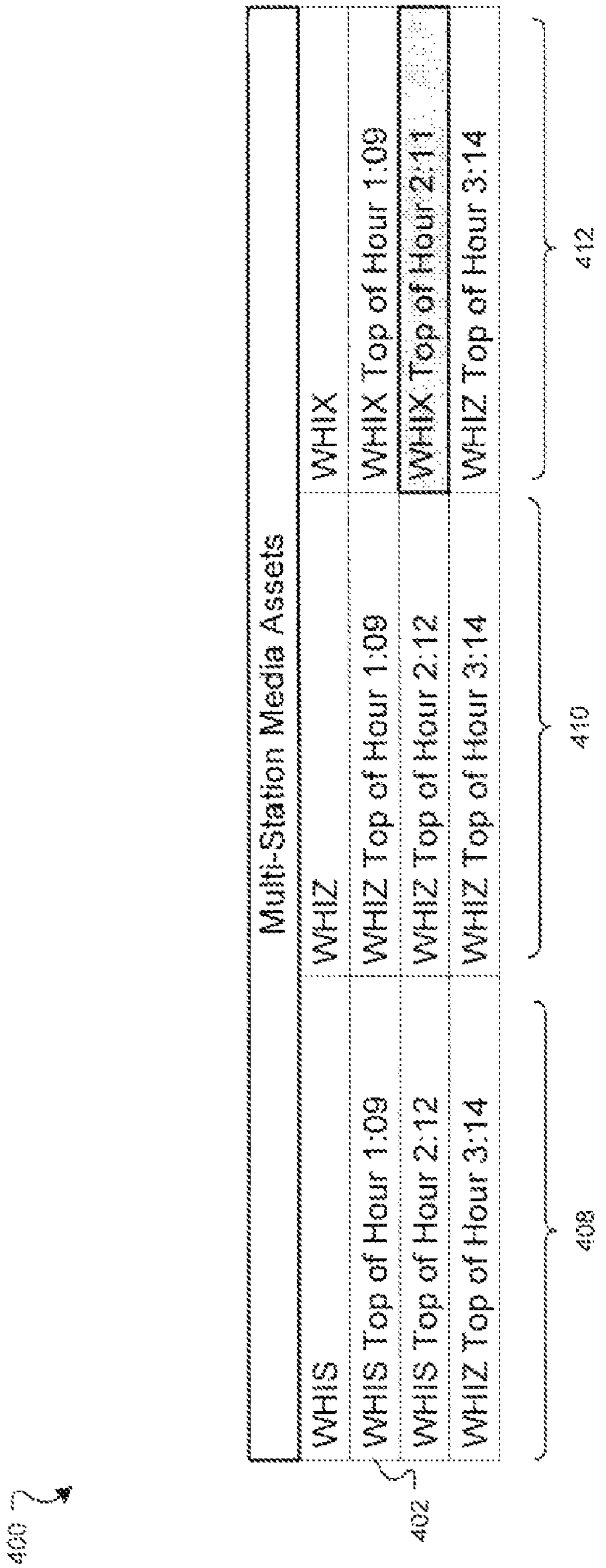
FIG. 3 is a diagram of a graphical user interface.

FIG. 3 is a diagram of an example of a graphical user interface (GUI) 400 for defining multi-station media assets. The GUI 400 can be provided by the media asset application 118. Each column of the GUI 400 includes a list of the media assets that are associated with a particular broadcast station 102. In this example, the GUI 400 shows lists 408, 410, and 412 of media assets that belong to the stations WHIS, WHIZ, and WHIX, respectively.

Each row of the GUI 400 shows the media assets that are linked together. For example, row 402 indicates that the media asset "WHIS Top of Hour" is linked to the media assets "WHIZ Top of Hour" and "WHIX Top of Hour." Thus, if the station WHIS is selected as the leader station, when station WHIS plays the media asset "WHIS Top of Hour," the follower stations WHIZ and WHIX will automatically play the media assets "WHIZ Top of Hour" and "WHIX Top of Hour," respectively.

The GUI 400 also shows the length of each media asset. The GUI 400 may highlight a media asset having a length that is different from other linked media assets. For example, the media asset "WHIX Top of Hour" is one second shorter than the other linked media assets. This allows the user (e.g., producer or DJ) to identify discrepancies in the lengths of the linked media assets. Because the linked media assets are played simultaneously, it is useful to have the linked media assets to have substantially the same lengths. In some example, the user may use an audio processing tool to stretch (or compress) a media asset that is shorter (or longer) than the other linked media assets. The system 100 may automatically insert a few seconds of silence after playing a media asset that is shorter than the other linked media assets.

In some examples, the follower stations may have built-in intelligence that utilizes the discrepancy in lengths between the linked media assets. For example, if there is an additional 1-minute interval, the follower station can automatically select a short segment (equal to or less than 1 minute) of commercial, jingle, or background music to fill in the gap.

The GUI 400 may retrieve stored information about the multi-station media assets from the table 124 (FIG. 1). The user may change the items in the rows and columns of the GUI 400 to change the linkage association among the media assets 122. The user may then store information about the updated multi-station media assets to the table 124.

In some examples, when a leader station plays a multi-station media asset, the leader station looks up the table 124 to determine which media assets are linked together, and explicitly informs the follower stations which media assets to play. For example, when the WHIS station plays "WHIS Top of Hour," the WHIS station informs WHIZ station to play "WHIZ TOP of Hour," and informs WHIX station to play "WHIX Top of Hour."

In some examples, the follower stations monitor what media assets are played on the leader station, then looks up the table 124 to determine which linked media asset to play. For example, when the WHIS station plays "WHIS Top of Hour," the WHIZ station looks up the table 124 to determine that it should play "WHIZ TOP of Hour," and the WHIX station looks up the table 124 to determine that it should play "WHIX Top of Hour."

Figure 4:
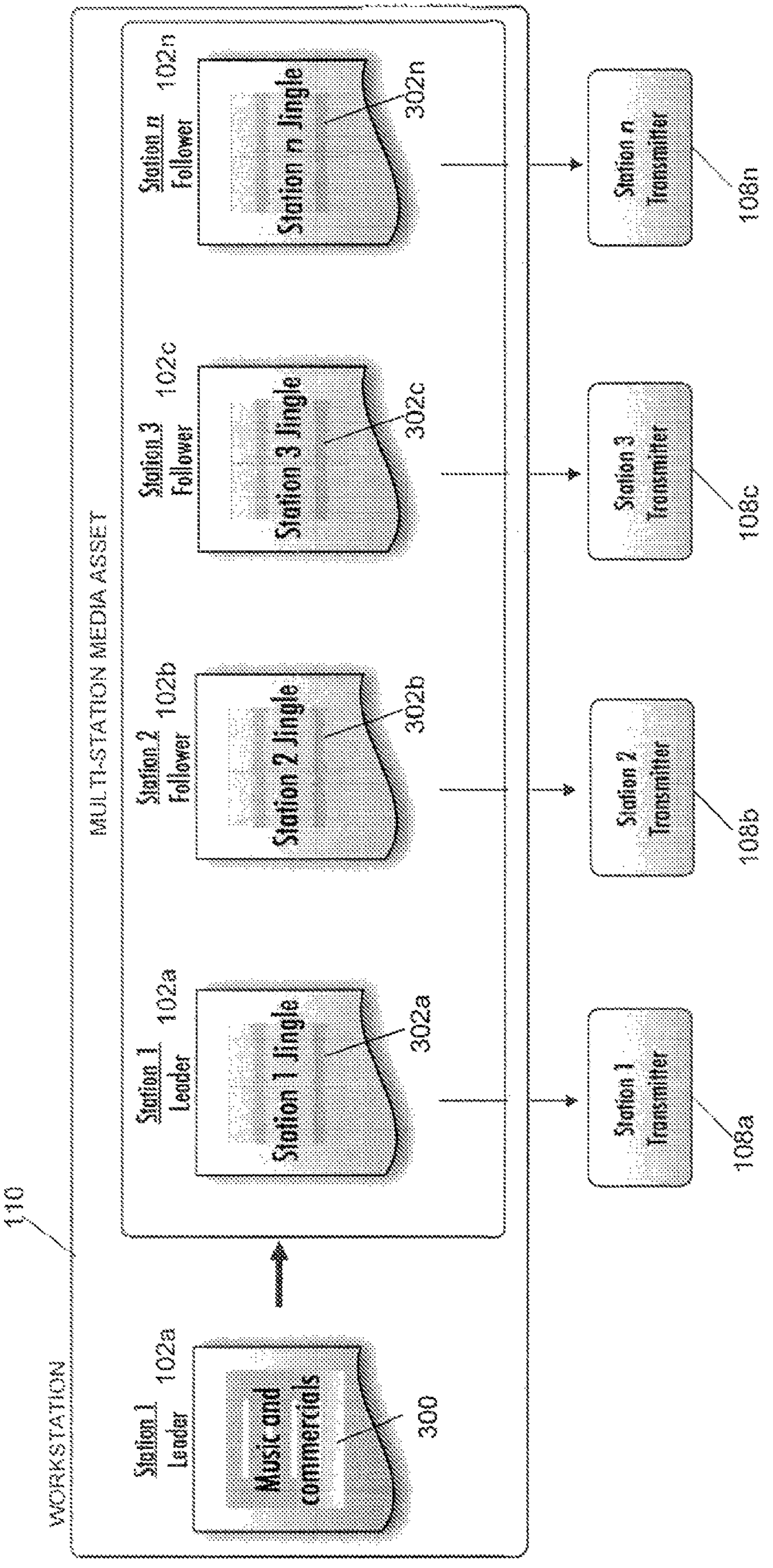
FIG. 4 is a diagram showing different media assets being played at different stations.

FIG. 4 is a diagram showing different jingles (e.g., 302*a* to 302*n*) being played at different stations during a commercial break. A playlist 300 on the leader station 102*a* indicates that a multi-station media asset is to be played. The stations play respective linked media assets based on information provided by the table 124. In this example, when the leader station 102*a* plays the "Station 1 Jingle," the follower stations 102*b*, 102*c*, and 102*n* plays "Station 2 Jingle," "Station 3 Jingle," and "Station n Jingle," respectively. The different jingles played by different stations are then sent to respective transmitters (e.g., 108*a* to 108*n*).

When the stations 102 broadcast through high definition (HD) channels, each HD channel may have multiple sub-channels. Media assets being played at different sub-channels can be linked together using the GUI 400 of FIG. 3.

Figure 5:
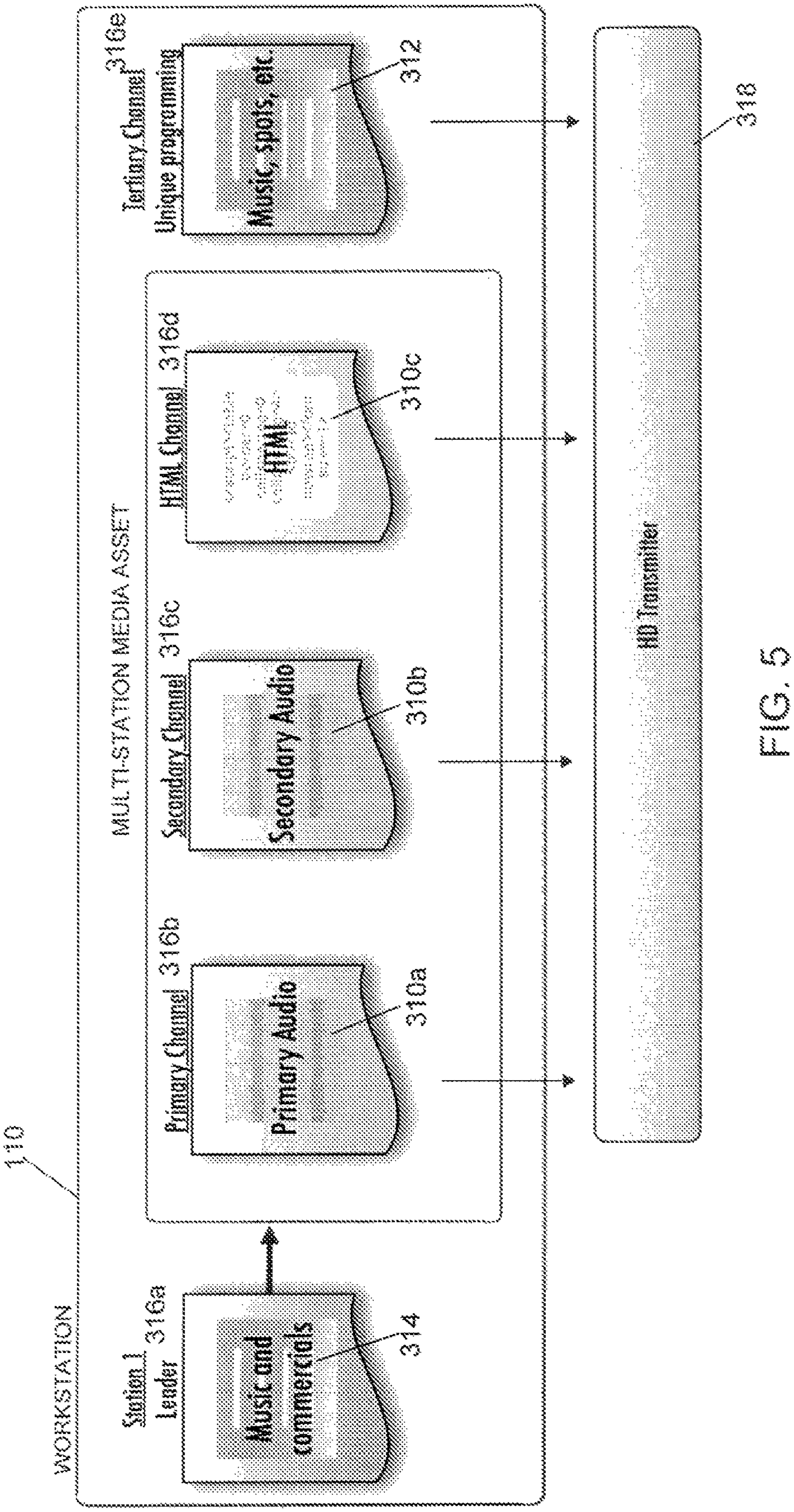
FIG. 5 is a diagram showing different media assets being played at different sub-channels of a high definition channel.

FIG. 5 is a diagram showing different media assets (e.g., 310*a* to 310*c*) being played at different sub-channels of an HD channel. A playlist 314 on a leader station 316 indicates that an HD content is to be played through the HD channel. The sub-channels play respective linked media assets based on information provided by the table 124. In this example, "Primary Audio," "Secondary Audio," and "HTML" media assets are linked together and played simultaneously at a primary channel 316*b*, a secondary channel 316*c*, and an HTML channel 316*d*, respectively. The HD channel may have a tertiary sub-channel 316*e* that broadcasts a unique programming not linked to the primary channel. The HD media assets 301*a*-310*c* and 312 are sent to a HD transmitter 318.

Figure 6:
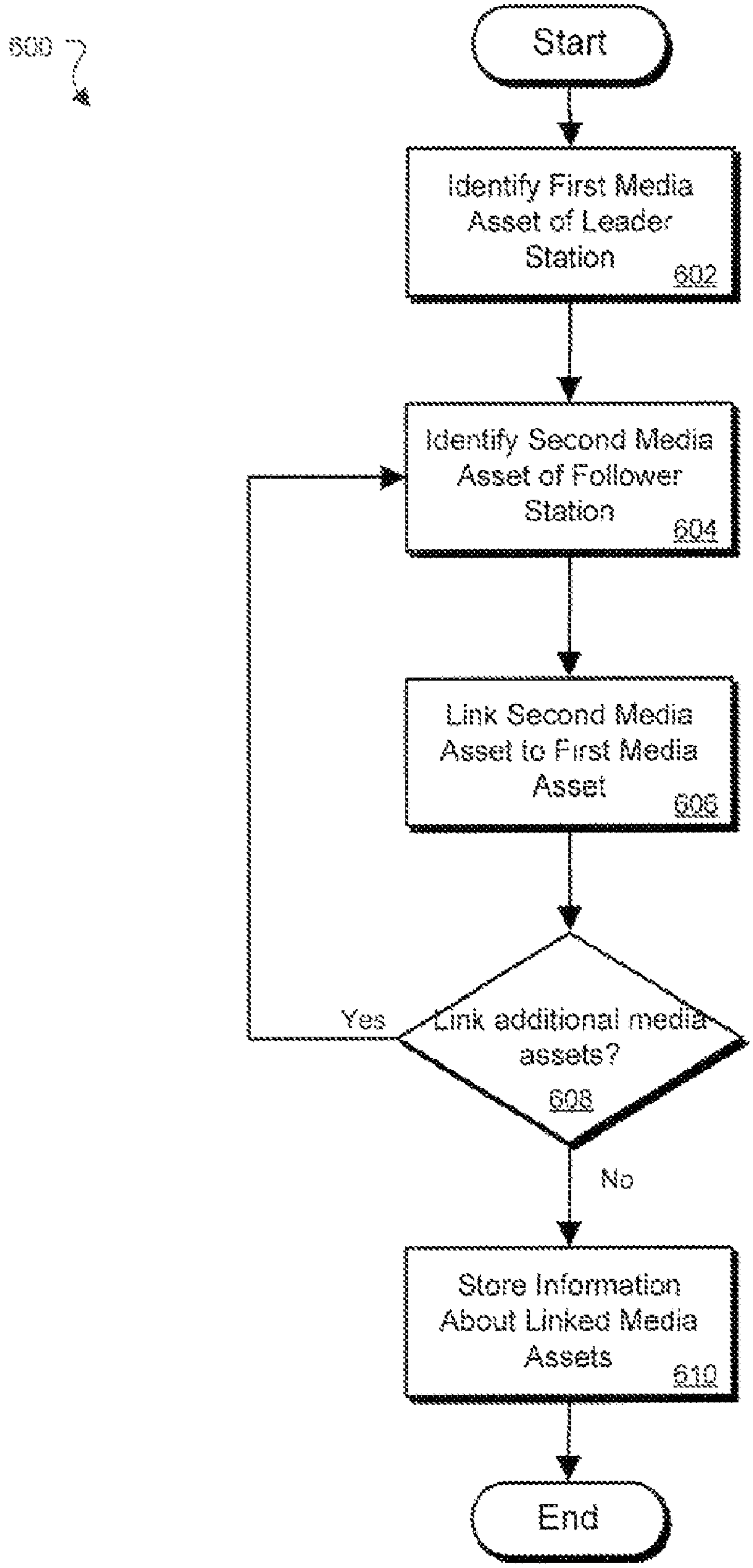
FIG. 6 is a flow diagram of a process for linking media assets.

FIG. 6 is a flow diagram of an example of a process 600 for linking media assets. During the process 600, a first media asset of (or associated with) a leader station is identified 602. The first media asset may be identified based on its media asset number, or by using the search tools provided by the GUI 200. A second media asset of a follower station is identified 604. The first and second media assets are linked together 606. The user can decide 608 to link additional media assets to the first media asset, or store information about the linking of media assets in a database. For example, the asset numbers of the media assets that are linked together may be stored in the media content repository 120.

Figure 7:
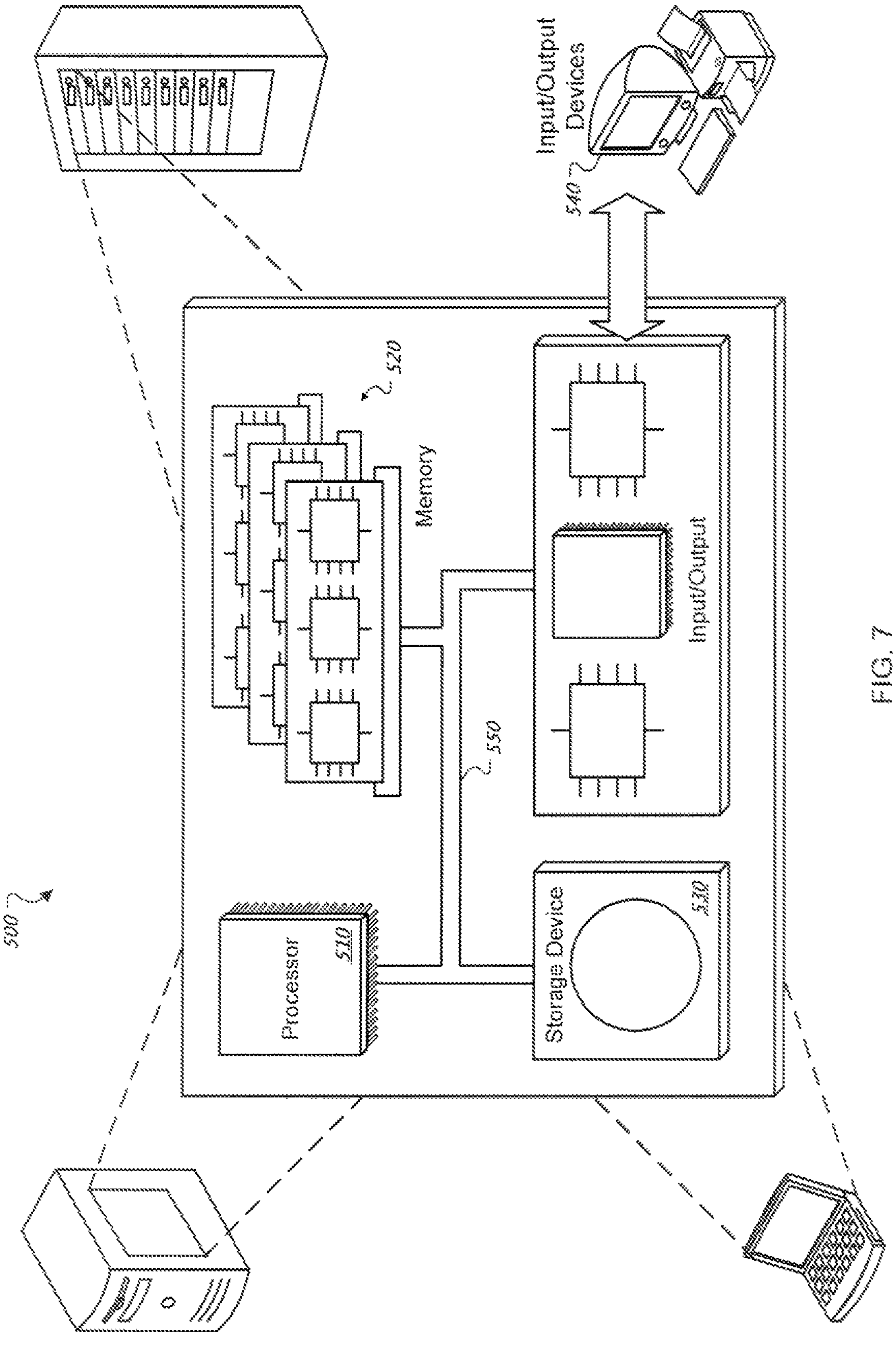
FIG. 7 is a schematic diagram of a generic computer system.

FIG. 7 is a schematic diagram of an example of a generic computer system 500 that can be used to implement, e.g., the workstation 110. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

For example, the media assets that are linked together can be hosted on different workstations. The multi-station media controller 116 can access media asset repositories of different workstations at different locations. The linked media assets can be of different types, e.g., a jingle of a station may be linked to a commercial of another station. The stations are not limited to broadcasting audio content. The media assets can include multimedia content, such as text, images, or video. The graphical user interfaces provided by the system 100 can be different from those described above. For example, some areas of the GUI 200 in FIG. 2 can be consolidated or expanded.

A number of implementations have been described. Nevertheless, it will be understood that various modifications can be made without departing from the spirit and scope of the following claims.

What is claimed is:

1. A system comprising:
a plurality of software-controlled broadcast stations each having at least one media asset; and
a controller having a graphical user interface to allow a DJ to link a first media asset of a first one of the stations to a second media asset of a second one of the stations, such that when the DJ schedules the first station to broadcast the first media asset at a specified time, the controller automatically causes the second station to broadcast the second media asset at the specified time,
wherein one of the stations operates as a leader station and another of the stations operates as a follower station during a simulcast, the leader station configured to provide to the follower station information about a length of an independent program period, and
wherein the follower station controls a switch to forward a signal representing a common program from the leader station to a signal modulator associated with the follower station during a first time period, and to forward a signal representing the second media asset from the follower station to the signal modulator during a second time period.

2. The system of claim 1 wherein the first and second media assets comprise jingles.

3. The system of claim 1 wherein the controller allows the user to link the first media asset of the first station to a media asset of each of the other stations, such that when the user schedules the first station to broadcast the first media asset at a specified time, the controller automatically causes all other stations to broadcast respective media assets linked to the first media asset at the specified time.

4. The system of claim 1 wherein the software-controlled broadcast stations comprise software-controlled radio stations.

5. The system of claim 1 wherein the software-controlled broadcast stations stream programs over a network.

6. The system of claim 1, further comprising a user interface to allow a user to select which of the media assets to be linked together.

7. The system of claim 1, further comprising a database storing information about which media assets are linked together.

8. A computer-implemented method for controlling software-controlled broadcast stations by a single DJ, comprising:
linking a first media asset of a first software-controlled broadcast station to a second media asset of a second software-controlled broadcast station, wherein the DJ identifies the assets that are linked together within a graphical user interface;
designating the first station as a leader station and the second station as a follower station during a simulcast, wherein the leader station is configured to provide to the follower station information about a length of an independent program period;
providing a user interface to allow the DJ to schedule broadcast of the first media asset at a specified time by the first station;
automatically causing the second media asset to be broadcast by the second station at the specified time; and
controlling a switch associated with the follower station to forward a signal representing a common program from the leader station to a signal modulator associated with the follower station during a first time period, and to forward a signal representing the second media asset from the follower station to the signal modulator during a second time period.

9. The method of claim 8 wherein the second media asset is broadcast by the second station at the specified time without input from the user regarding when to broadcast the second media asset.

10. The method of claim 8 wherein the first and second media assets comprise jingles.

11. The method of claim 8, further comprising providing a second user interface to allow the user to select which of the media assets to be linked together.

12. The method of claim 8, further comprising broadcasting radio frequency signals associated with the first and second media assets.

13. The method of claim 8, further comprising streaming data packets associated with the first and second media assets over a network.

14. The method of claim 8, further comprising executing parallel processes to implement the software-controlled broadcast stations, each process corresponding to one of the stations.

* * * * *